US012431071B2

(12) United States Patent
Nien

(10) Patent No.: US 12,431,071 B2
(45) Date of Patent: Sep. 30, 2025

(54) OPERATIONAL METHOD FOR MEMORIES

(71) Applicant: NOVATEK Microelectronics Corp., Hsin-Chu (TW)

(72) Inventor: Chen-Ming Nien, Changhua County (TW)

(73) Assignee: NOVATEK Microelectronics Corp., Hsin-Chu (TW)

( * ) Notice: Subject to any disclaimer, the term of this patent is extended or adjusted under 35 U.S.C. 154(b) by 0 days.

(21) Appl. No.: 18/660,249

(22) Filed: May 10, 2024

(65) Prior Publication Data

US 2025/0182676 A1 Jun. 5, 2025

Related U.S. Application Data

(60) Provisional application No. 63/605,591, filed on Dec. 4, 2023.

(51) Int. Cl.
*G09G 3/32* (2016.01)

(52) U.S. Cl.
CPC ........... *G09G 3/32* (2013.01); *G09G 2310/08* (2013.01)

(58) Field of Classification Search
None
See application file for complete search history.

(56) References Cited

U.S. PATENT DOCUMENTS 8,212,759 B2 * 7/2012 Luo ..................... G09G 3/3685 345/204
11,640,784 B2 * 5/2023 Su ........................... G09G 3/32 345/55
12,142,190 B1 * 11/2024 Lin .......................... G09G 3/32
2005/0078104 A1 * 4/2005 Matthies ................ H10K 50/86 345/204
2020/0020676 A1 * 1/2020 Cok ...................... H01L 25/167
2020/0365202 A1 * 11/2020 Oh ......................... G11C 16/10
2021/0166619 A1 * 6/2021 Kim ..................... H05B 47/155
2022/0317965 A1 * 10/2022 Lin .......................... G09G 3/32
2023/0197021 A1 6/2023 Wang
2023/0206798 A1 6/2023 Kim
2023/0215398 A1 7/2023 Lee
2023/0236785 A1 * 7/2023 Joo ...................... G09G 3/2096 345/1.3
2025/0016285 A1 * 1/2025 Okamoto ................ H04N 7/08

FOREIGN PATENT DOCUMENTS

TW 202209725 3/2022

* cited by examiner

*Primary Examiner* — Kenneth Bukowski
(74) *Attorney, Agent, or Firm* — Winston Hsu

(57) ABSTRACT

An operational method for a plurality of memories includes steps of: outputting a select signal to a first group of memories among the plurality of memories, but not outputting the select signal to a second group of memories among the plurality of memories different from the first group; outputting a clock signal to a third group of memories among the plurality of memories, but not outputting the clock signal to a fourth group of memories among the plurality of memories different from the third group; outputting a command to a fifth group of memories among the plurality of memories, but not outputting the command to a sixth group of memories among the plurality of memories different from the fifth group; and selecting one of the plurality of memories according to the select signal, the clock signal and the command.

9 Claims, 15 Drawing Sheets

OPERATIONAL METHOD FOR MEMORIES

CROSS REFERENCE TO RELATED APPLICATIONS

This application claims the benefit of U.S. Provisional Application No. 63/605,591, filed on Dec. 4, 2023. The content of the application is incorporated herein by reference.

BACKGROUND OF THE INVENTION

1. Field of the Invention

The present invention relates to an operational method for memories, and more particularly, to an operational method for accessing memories in a light-emitting diode (LED) display.

2. Description of the Prior Art

Direct view light-emitting diode (LED) displays with an LED array used as actual display pixels have gradually developed in recent years. In a large-scale direct view LED display, the screen is constructed by connecting a great number of LED cabinets, each having a display panel with multiple light boards, and a control board carrying an LED controller for forwarding the display data to each light board, to show desired images on the display area of each light board. Each light board may be deployed with a flash memory, for storing necessary compensation information for the LED pixels on the light board.

The light board is a display unit of an LED screen. In the large-scale LED display, if any display pixel or area is damaged, fixing is performed by regarding a light board as a unit; that is, the LED screen may be repaired by replacing the light board having damaged pixel(s) by a new one. The new light board having new LED pixels may have different compensation information, and the compensation data for the new LED pixels should be carried in a flash memory corresponding to the new light board, where the original flash memory should be updated or replaced with a new one. As a result, the LED controller may directly read the accurate compensation data for the new light board from the corresponding flash memory, and thus additional efforts of manually updating the compensation data may be avoided.

However, in the prior art, the LED controller is requested to control a great number of light boards, and thus has to be deployed with a great number of control pins to access the flash memories, in order to obtain the compensation data. The great number of control pins requires considerable circuit costs, especially when the number of light boards has a gradually increasing trend in the LED display.

SUMMARY OF THE INVENTION

It is therefore an objective of the present invention to provide a novel operational method for accessing the flash memories, in order to solve the abovementioned problems.

An embodiment of the present invention discloses an operational method for a plurality of memories. The operational method comprises steps of: outputting a select signal to a first group of memories among the plurality of memories, but not outputting the select signal to a second group of memories among the plurality of memories different from the first group; outputting a clock signal to a third group of memories among the plurality of memories, but not outputting the clock signal to a fourth group of memories among the plurality of memories different from the third group; outputting a command to a fifth group of memories among the plurality of memories, but not outputting the command to a sixth group of memories among the plurality of memories different from the fifth group; and selecting one of the plurality of memories according to the select signal, the clock signal and the command.

Another embodiment of the present invention discloses a controller, which is configured to control a plurality of memories. The controller comprises a plurality of select pins, a plurality of clock pins and a plurality of signal pins. The plurality of select pins are respectively coupled to a first plurality of groups of memories among the plurality of memories. The plurality of clock pins are respectively coupled to a second plurality of groups of memories among the plurality of memories. The plurality of signal pins are respectively coupled to a third plurality of groups of memories among the plurality of memories. The controller outputs a select signal through one of the plurality of select pins, outputs a clock signal through one of the plurality of clock pins, and outputs a command through one of the plurality of signal pins. The controller selects one of the plurality of memories according to the select signal, the clock signal and the command.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
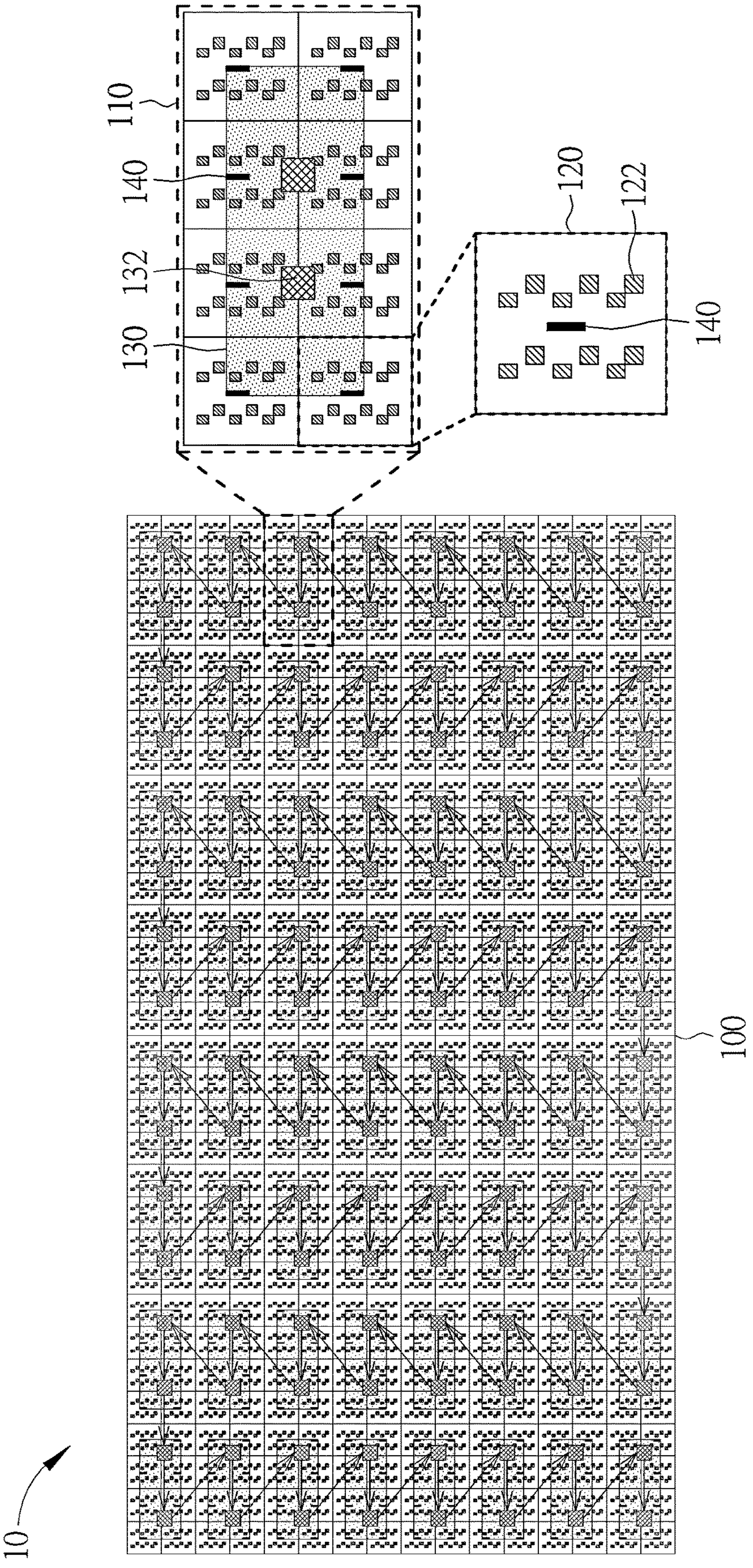
FIG. 1 is a schematic diagram of an exemplary direct view LED display.

FIG. 1 is a schematic diagram of an exemplary direct view light-emitting diode (LED) display 10. The LED display 10 may be a large-scale display, in which an LED screen 100 is composed of multiple LED cabinets 110, and each LED cabinet 110 includes a plurality of light boards 120 and a control board 130.

In detail, each light board 120 may be a display unit for constructing the LED screen 100. The light board 120 may be formed of a printed circuit board (PCB), on which an LED array and several LED drivers 122 are deployed. The LED drivers 122 are used for providing driving currents for the corresponding LEDs, to drive the LEDs to emit lights. The light boards 120 are connected to the control board 130 through connectors 140, and thus the LEDs on the light boards 120 may form a pixel array as a fragment of the LED screen 100. Each LED cabinet 110 may further include one or more LED controllers 132, which are deployed on the control board 130 and configured to receive video data and related commands from a video source, to determine the images to be displayed by the LED pixels in the corresponding LED cabinet 110 according to the commands, and correspondingly forward the display data to the corresponding light boards 120. The LED controllers 132 may also be responsible for performing appropriate compensation on the received video data. In general, the illumination characteristics of different LED pixels may be inconsistent due to process variations (or other factors), which should be compensated during the display operations, in order to improve the visual quality. In several embodiments, the LED cabinet 110 may further include a power supply device or power integrated circuit (IC) (not illustrated for brevity), which may also be deployed on the control board 130.

Figure 2:
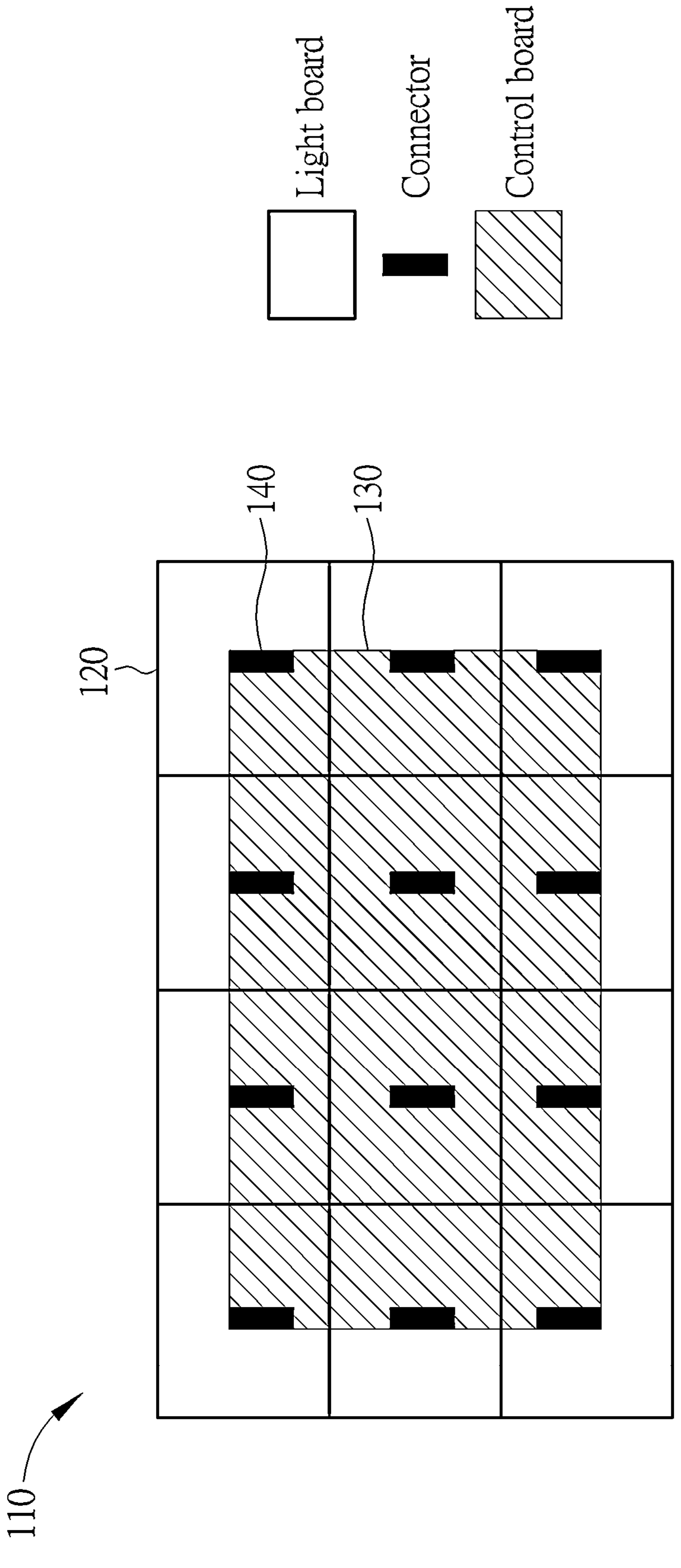
FIG. 2 illustrates a simplified structure of the LED cabinet.

FIG. 2 illustrates a simplified structure of the LED cabinet 110, in which the control board 130 is connected to 12 light boards 120 through the connectors 140. Each light board 120 may include a flash memory or may be coupled to a flash memory (not illustrated). The flash memory is used for storing the compensation data for the LED pixels in the corresponding light board 120, where the compensation data aim at compensating for the inconsistency of the illumination characteristics such as luminance and/or chromaticity. During the display operations, the LED controller 132 may access the flash memories to obtain the compensation data, in order to modify the display data by using the compensation data.

In such a situation, the LED controller 132 of this LED cabinet 110 is requested to control multiple flash memories. Assuming that the LED cabinet 110 shown in FIG. 2 has only one LED controller, this LED controller is requested to perform read/write operations on 12 flash memories of the 12 light boards 120.

The LED controller 132 usually controls the flash memories through a serial peripheral interface (SPI), which allows a master device (i.e., the LED controller 132) to control multiple slave devices (i.e., the flash memories). The SPI may include several chip select (CS) pins, a clock (CLK) pin, a master-out-slave-in pin (abbreviated as slave-in (SI) pin hereinafter), and multiple master-in-slave-out pins (abbreviated as slave-out (SO) pins hereinafter). Each of the CS pins is a select pin that the LED controller 132 uses to select a specific flash memory. The CLK pin is a control pin used for forwarding a clock signal, to synchronize the timing of the slave devices and the master device. The SI pin is an output pin of the LED controller 132 (since it is a master-out-slave-in pin), where the LED controller 132 may use the SI pin to output commands or data to the flash memories. Each SO pin is an input pin of the LED controller 132 (since it is a master-in-slave-out pin), where the LED controller 132 uses the SO pins to receive data from the flash memories.

Figure 3:
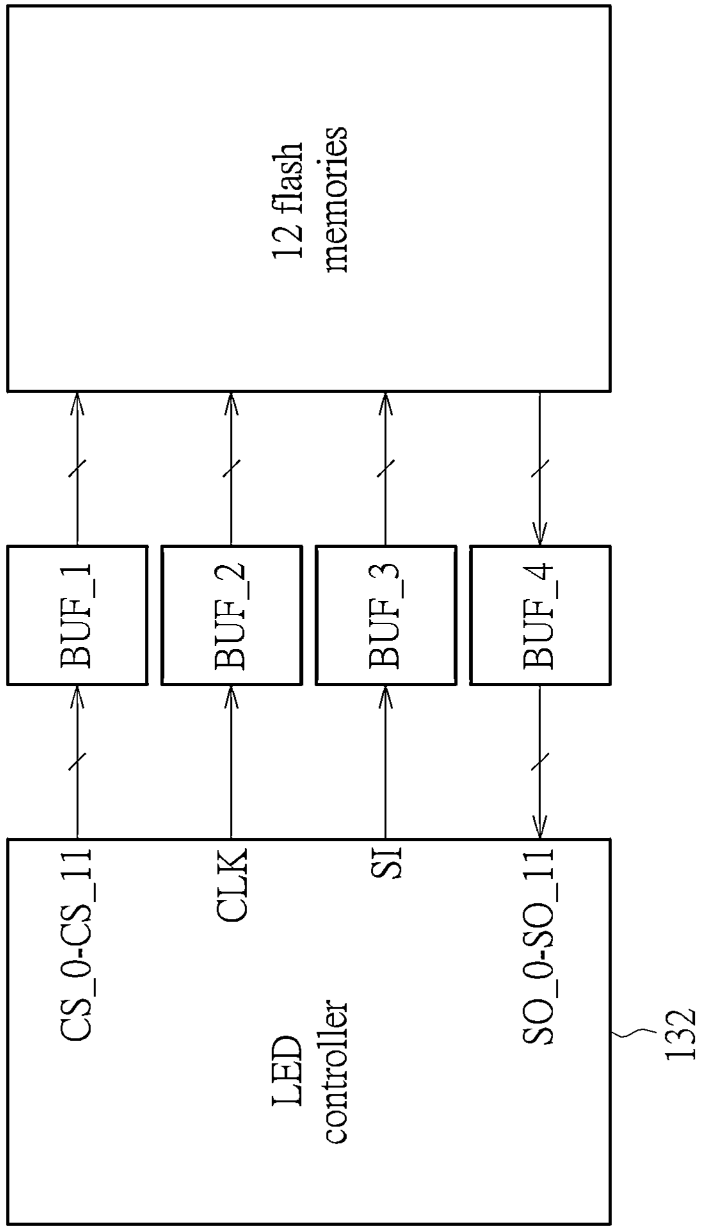
FIG. 3 illustrates the control pins of the LED controller used for controlling the flash memories.

FIG. 3 illustrates the control pins of the LED controller 132 used for controlling the flash memories, where the CS pins, CLK pin, SI pin and SO pins of the SPI are shown. Assuming that there are 12 flash memories controlled by the LED controller 132, the interface includes 12 CS pins CS_0-CS_11 coupled to the 12 flash memories, respectively. The 12 flash memories may receive the same clock signal, and thus only one CLK pin is enough for the LED controller 132 to supply the clock signal.

The SI pin is used for forwarding any signals or data from the LED controller 132 to the flash memories. For example, during the usage of the LED screen 100, each LED pixel on the light board 120 may experience different degrees of aging, resulting in different degrees of luminance efficiency attenuations, which may further generate additional luminance non-uniformity. Therefore, the LED controller 132 is requested to update the compensation data for the LED pixels, and write the updated compensation data into the flash memories through the SI pin. In general, a flash memory is able to receive the commands or data only when it is enabled by the CS pin, and thus only one flash memory may be enabled at one time; hence, only one SI pin is enough for the LED controller 132 to deliver the commands or data.

The SO pins are used for forwarding any signals or data from the flash memories to the LED controller 132. For example, when receiving the display data of an LED pixel from the video source, the LED controller 132 may read the compensation data corresponding to this LED pixel from the flash memory, in order to modify the display data by using the compensation data. Since there are 12 flash memories controlled by the LED controller 132, the LED controller 132 has 12 SO pins SO_0-SO-11 coupled to 12 flash memories, respectively.

Note that the LED controller 132 may be coupled to the flash memories of different light boards 120, and each control signal should be forwarded through the connecting wires on the control board 130 and the light board 120 and the connector 140 therebetween. In such a situation, the control signal is requested to be forwarded through a considerable distance. In general, the output driver of the LED controller 132 is usually implemented in an IC, and may not have enough driving capabilities. In order to solve this problem, one or more buffers may be deployed on the control board 130 or the light board 120, to be coupled between the LED controller 132 and the flash memories. Therefore, the control signals or data output from the control pins of the LED controller 132 may be forwarded to the flash memories through the buffer(s).

For example, as shown in FIG. 3, the CS signals output from the CS pins CS_0-CS_11 are forwarded through a buffer BUF_1, the clock signal output from the CLK pin is forwarded through a buffer BUF_2, and the commands or data output from the SI pin are forwarded through a buffer BUF_3. In addition, the data (e.g., compensation data) read out from the flash memories may also be forwarded through a buffer BUF 4. The buffers BUF_1-BUF_4 may also provide sufficient driving capabilities for one control pin to drive multiple output devices.

In another embodiment, if the LED controller 132 has sufficient driving capabilities for driving the flash memories, the buffers may be omitted without affecting the operations of accessing the flash memories.

As shown in FIG. 3, if one LED controller 132 is responsible for controlling 12 flash memories through the SPI, it requires 26 pins for forwarding the related control signals, including 12 CS pins, 1 CLK pin, 1 SI pin, and 12 SO pins. The great number of control pins requires considerable circuit costs. Therefore, the present invention provides a novel operational method for the LED controller to access multiple flash memories with fewer control pins.

Figure 4:
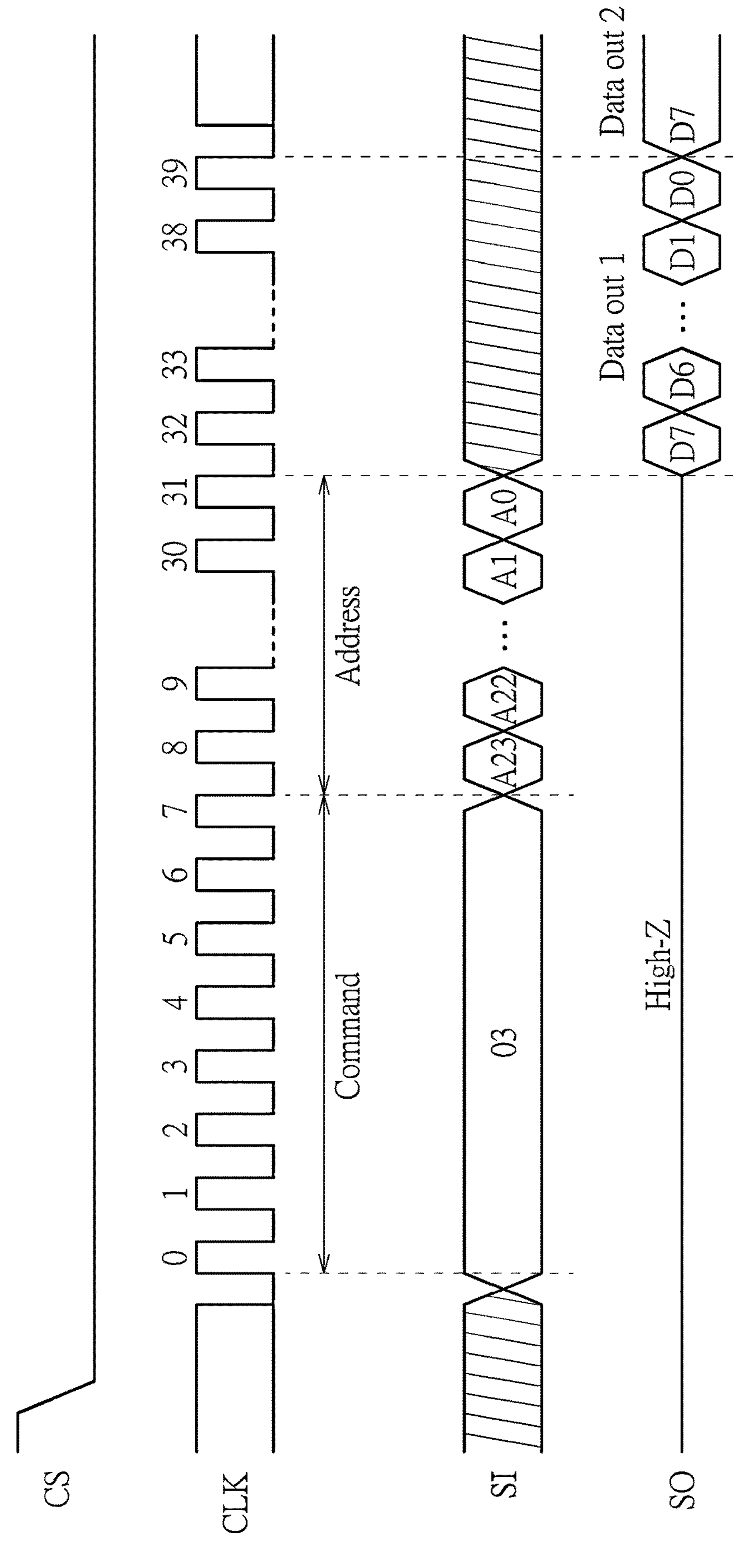
FIG. 4 is a waveform diagram of SPI control signals in a read operation.

The operational principle of the SPI is briefly described herein. FIG. 4 is a waveform diagram of SPI control signals in a read operation. When the LED controller needs to read the compensation data from a specific flash memory, the CS pin corresponding to this flash memory may be pulled low, and the CLK pin starts to toggle with a predefined clock frequency. When the clock starts to be output, the SI pin may forward a command in the first byte, and then forward an address in subsequent several bytes (3 bytes or equivalently 24 clock cycles in this example). The command "03" output from the SI pin indicates that the read operation is enabled. The address specifies the position(s) of the flash memory in which the data will be read out. Subsequently, the data stored in the specified address (s) are output to the LED controller through the SO pin during the following data output periods. The corresponding CS pin will return to high level (not illustrated) after the required data are fully read out.

Figure 5:
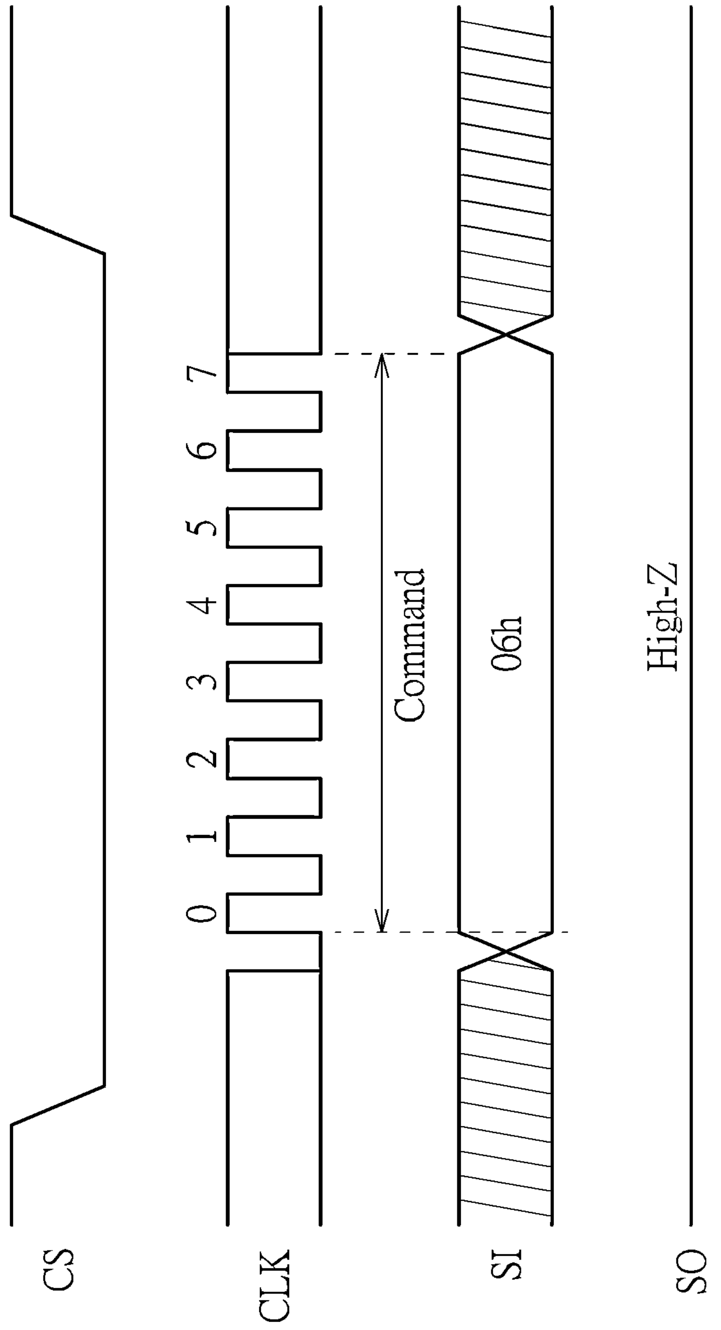
FIG. 5 is a waveform diagram of SPI control signals in a write operation.

FIG. 5 is a waveform diagram of SPI control signals in a write operation. When the LED controller needs to write the compensation data into a specific flash memory, the CS pin corresponding to this flash memory may be pulled low, and the CLK pin starts to toggle with a predefined clock frequency. Simultaneously, the SI pin may forward a command "06h", which indicates that the write operation is enabled. The corresponding CS pin will return to high level after the command is completely transmitted. During the write operation, the LED controller may not read data from the flash memory, and the corresponding SO pin may be kept in a high-impedance (High-Z) state.

As can be seen, the read or write operation of the SPI requests that three conditions should be satisfied: the CS pin enters a low level, the CLK pin is toggled appropriately, and the SI pin forwards a valid command. Therefore, in order to access a target flash memory, the LED controller may apply multiple CS pins to perform selection. In addition, two or more CLK pins may be respectively coupled to two or more groups of flash memories, where an accurate clock signal is provided for a group and no clock signal is provided for other group(s). Further, different SI pins may be coupled to multiple groups of flash memories, respectively, where the valid and accurate command is output from only one SI pin to perform selection.

Correspondingly, the flash memories may be classified into a first plurality of groups in a first manner, among which each group is configured to receive the select signal from one of the CS pins. The flash memories may also be classified into a second plurality of groups in a second manner (which is different from the first manner), among which each group is configured to receive the clock signal from one of the CLK pins. The flash memories may further be classified into a third plurality of groups in a third manner (which is different from the first manner and the second manner), among which each group is configured to receive the commands from one of the SI pins.

Under the above grouping manners, each flash memory may belong to one of the first plurality of groups, belong to one of the second plurality of groups, and also belong to one of the third plurality of groups. In addition, each flash memory may belong to at least one different group from another flash memory. Therefore, in order to select and access a target flash memory, the LED controller may output a correct select signal to a group among the first plurality of groups to which the target flash memory belongs, output a clock signal to a group among the second plurality of groups to which the target flash memory belongs, and output a valid command (e.g., a read or write enable command) to a group among the third plurality of groups to which the target flash memory belongs. In such a situation, the target flash memory may be selected according to the combination of the select signal, the clock signal and the command.

Figure 6A:
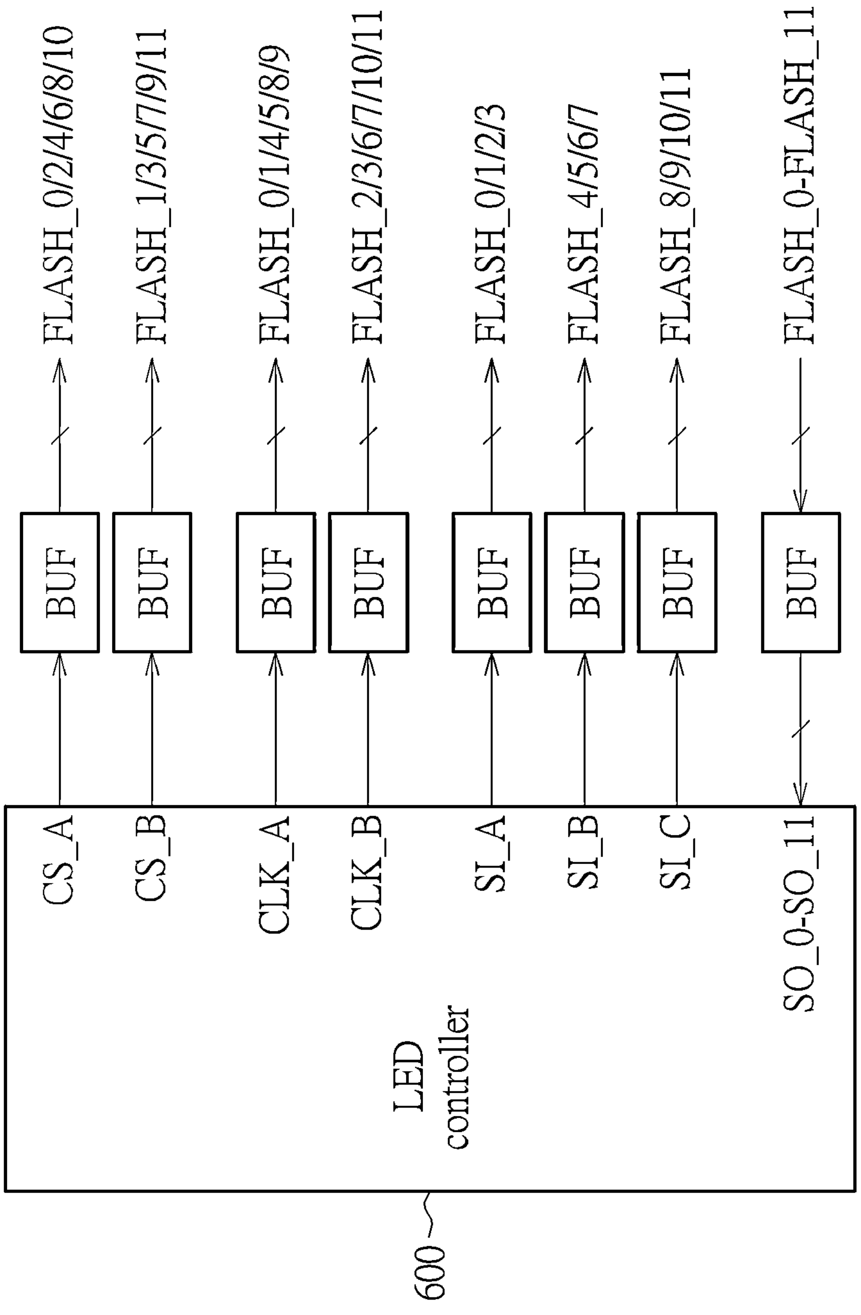
FIG. 6A illustrates an exemplary implementation of connections of an LED controller to the flash memories according to an embodiment of the present invention.

FIG. 6A illustrates an exemplary implementation of connections of an LED controller 600 to the flash memories according to an embodiment of the present invention. In this embodiment, the LED controller 600 is configured to control 12 flash memories numbered from 0 to 11 (i.e., FLASH_0-FLASH_11). The LED controller 600 includes two CS pins CS_A and CS_B, two CLK pins CLK_A and CLK_B, and three SI pins SI_A, SI_B and SI_C as its output pins. The LED controller 600 may also include 12 SO pins SO_0-SO_11 as its input pins.

Figure 6B:
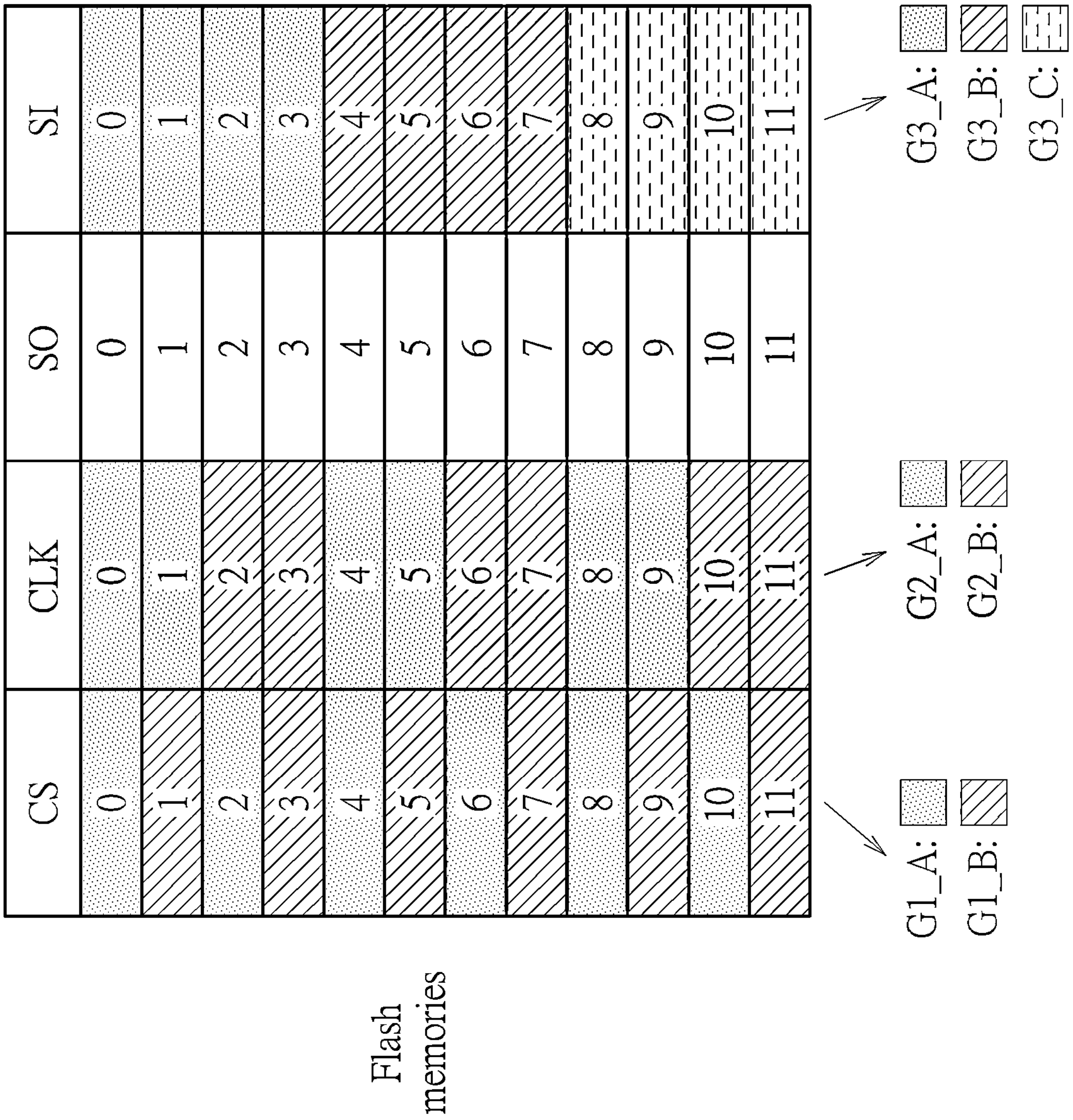
FIG. 6B illustrates group classifications of the flash memories for being connected with the LED controller.

FIG. 6B illustrates group classifications of the flash memories FLASH_0-FLASH_11 for being connected with the LED controller 600. In detail, the flash memories FLASH_0-FLASH_11 may be classified into two groups G1_A and G1_B, where the group G1_A, which includes the flash memories FLASH_0/2/4/6/8/10, is coupled to the CS pin CS_A, and the group G1_B, which includes the flash memories FLASH_1/3/5/7/9/11, is coupled to the CS pin CS_B. The flash memories FLASH_0-FLASH_11 may also be classified into two groups G2_A and G2_B in a different manner, where the group G2_A, which includes the flash memories FLASH_0/1/4/5/8/9, is coupled to the CLK pin CLK_A, and the group G2_B, which includes the flash memories FLASH_2/3/6/7/10/11, is coupled to the CLK pin CLK_B. The flash memories FLASH_0-FLASH_11 may further be classified into three groups G3_A, G3_B and G3_C in another different manner, where the group G3_A, which includes the flash memories FLASH_0/1/2/3, is coupled to the SI pin SI_A, the group G3_B, which includes the flash memories FLASH_4/5/6/7, is coupled to the SI pin SI_B, and the group G3_C, which includes the flash memories FLASH_8/9/10/11, is coupled to the SI pin SI_C. Therefore, each flash memory FLASH_0-FLASH_11 is coupled to the LED controller 600 through one of the two CS pins CS_A and CS_B, one of the two CLK pins CLK_A and CLK_B, and one of the three SI pins SI_A, SI_B and SI_C. Every two flash memories are connected differently at least in one of the CS pins, CLK pins and SI pins; hence, the target flash memory to perform read/write operation can be selected according to the outputs of the select signal, clock signal and command.

Figure 7:
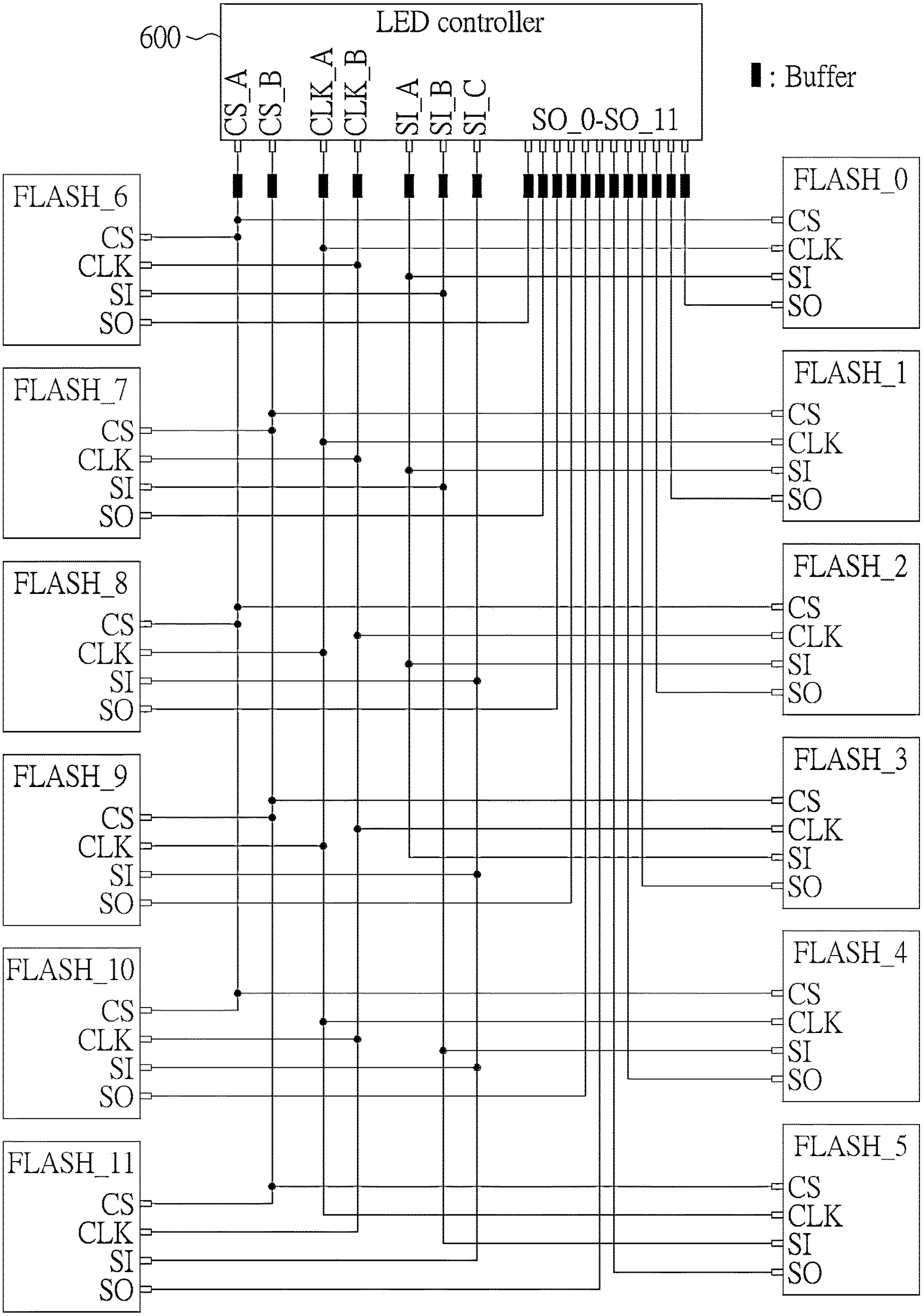
FIG. 7 is a schematic diagram of the system structure of the LED controller connected with 12 flash memories.

An overall system structure of the LED controller 600 connected with 12 flash memories FLASH_0-FLASH_11 is shown in FIG. 7. Referring to FIG. 7 along with FIGS. 6A and 6B, each of the CS pins CS_A and CS_B is coupled to 6 of the flash memories, each of the CLK pins CLK_A and CLK_B is coupled to 6 of the flash memories, and each of the SI pins SI_A, SI_B and SI_C is coupled to 4 of the flash memories. In such a situation, the operations for controlling the 12 flash memories FLASH_0-FLASH_11 may be realized by using only 19 pins, which include 2 CS pins, 2 CLK pins, 3 SI pins and 12 SO pins. This is a significant improvement as compared to the general SPI implementation with 26 control pins as shown in FIG. 3.

Similarly, the control signals output from the CS pins CS_A and CS_B, the CLK pins CLK_A and CLK_B, and the SI pins SI_A, SI_B and SI_C are delivered through a buffer (BUF). The implementations associated with the buffers are similar to those illustrated in FIG. 3 and related descriptions, and will not be repeated herein.

In order to select a target flash memory, the LED controller 600 may output a select signal through one of the CS pins (CS_A or CS_B), output a clock signal through one of the CLK pins (CLK_A or CLK_B), and output a command through one of the SI pins (SI_A, SI_B or SI_C). Therefore, the LED controller 600 may select one of the flash memories FLASH_0-FLASH_11 according to the select signal, the clock signal and the command.

For example, when the LED controller 600 communicates with the flash memories FLASH_0-FLASH_11 through the SPI, based on the SPI specification, it may pull low one of the CS pins (CS_A or CS_B), output the appropriate clock signal through one of the CLK pins (CLK_A or CLK_B), and output a read or write enable command through one of the SI pins (SI_A, SI_B or SI_C). A flash memory may operate normally only when the corresponding CS pin is pulled low, the corresponding CLK pin is toggled appropriately, and the corresponding SI pin provides a valid command; that is, the three conditions are all satisfied. As a result, under the pin connections as shown in FIGS. 6A, 6B and 7, only one flash memory can react correctly, which means that only one flash memory is selected and accessed by the LED controller 600 with a combination of the select signal, the clock signal and the command.

For example, if the LED controller 600 needs to perform a write operation on the flash memory FLASH_0, it may output correct control signals through the pins CS_A, CLK_A and SI_A. For example, the CS pin CS_A may be pulled low, the CLK pin CLK_A may toggle appropriately, and the SI pin SI_A may provide a valid command for the SPI. In such a situation, the flash memory FLASH_0 is enabled by the pull-low CS signal to decode and receive the command based on the received clock signal, as the operation shown in FIG. 5.

In other words, with the classification associated with the select pins, the flash memory FLASH_0 belongs to the group G1_A that receives the select signal from the CS pin CS_A. With the classification associated with the clock pins, the flash memory FLASH 0 belongs to the group G2_A that receives the clock signal from the CLK pin CLK_A. With the classification associated with the signal pins, the flash memory FLASH_0 belongs to the group G3_A that receives the valid command from the SI pin SI_A. Since the flash memory FLASH_0 belongs to these groups, it is selected by the LED controller 600 based on the control signals provided from these control pins.

Figure 8:
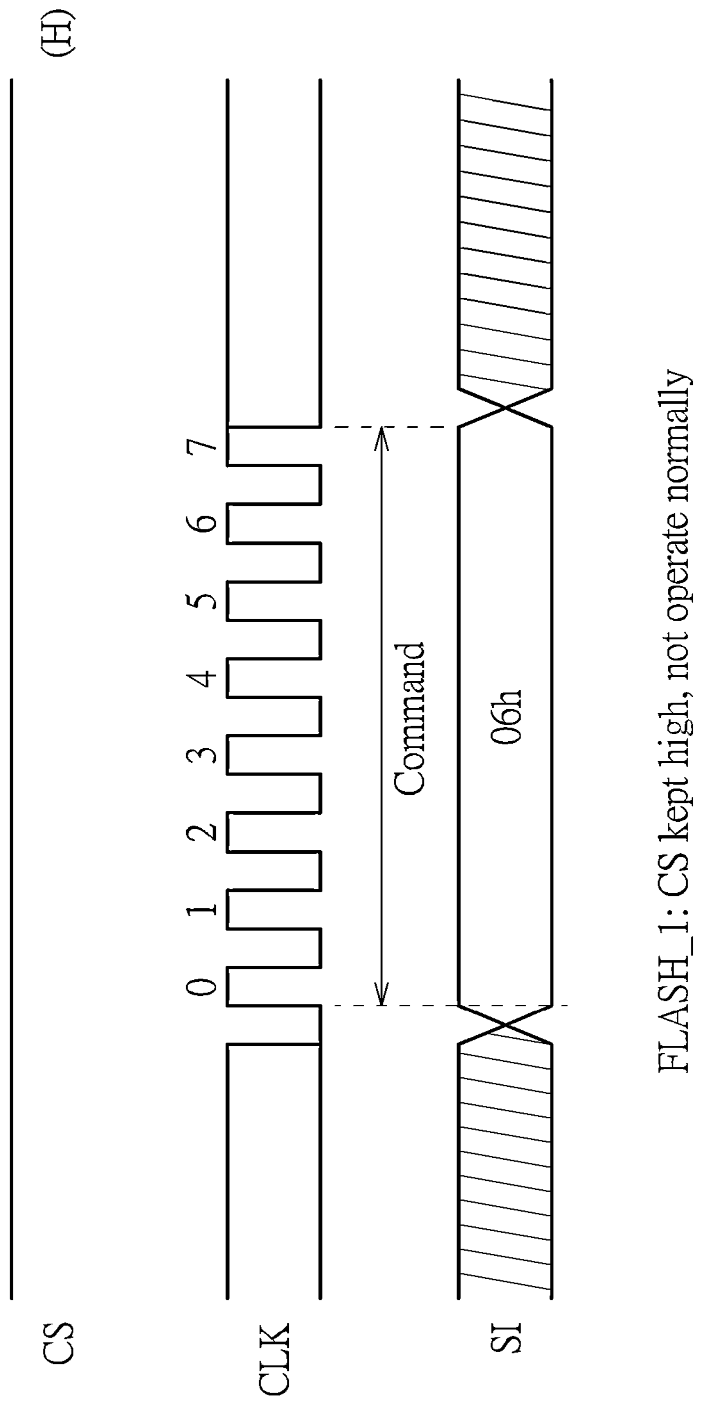
FIG. 8 is a waveform diagram of a non-selected CS pin.

As for the flash memories FLASH_1/3/5/7/9/11, the corresponding CS pin CS_B may be kept high; hence, these flash memories fail to operate normally regardless of whether the clock signal and the command are correctly received. For example, as shown in FIG. 8, although the flash memory FLASH_1 is provided with the correct clock signal and valid write enable command "06h", it may not operate normally to receive the command since the CS signal is kept high.

Figure 9:
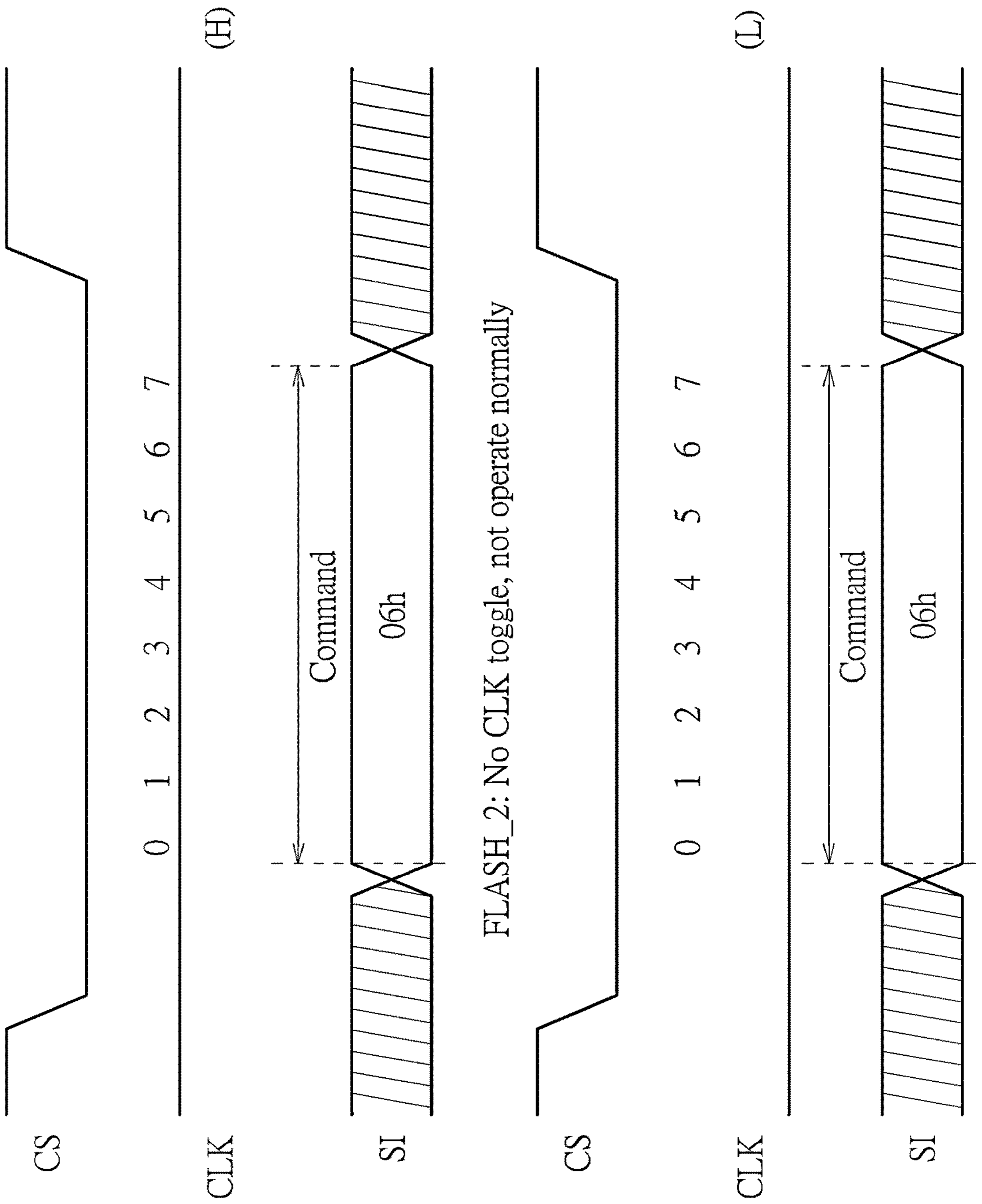
FIG. 9 is a waveform diagram of a non-selected CLK pin.

As for the flash memories FLASH_2/3/6/7/10/11, the corresponding CLK pin CLK_B may not toggle; hence, these flash memories fail to operate normally regardless of whether the CS signal and the command are correctly received. For example, as shown in FIG. 9, although the flash memory FLASH_2 is provided with the correct CS signal and valid write enable command "06h", it may not be able to decode the command since no clock signal is received. As shown in FIG. 9, the non-selected CLK pin may be kept high or kept low. As long as the CLK pin does not toggle, the corresponding flash memories cannot operate normally.

As for the flash memories FLASH_4-FLASH_11, the corresponding SI pins SI_B and SI_C may not forward a valid command; hence, these flash memories fail to operate normally regardless of whether the CS signal and the clock signal are correctly received. For example, as shown in FIG. 10, although the flash memory FLASH_4 or FLASH_8 is provided with the correct CS signal and clock signal, it may not be able to perform the correct operation since no valid command is received.

Figure 10:
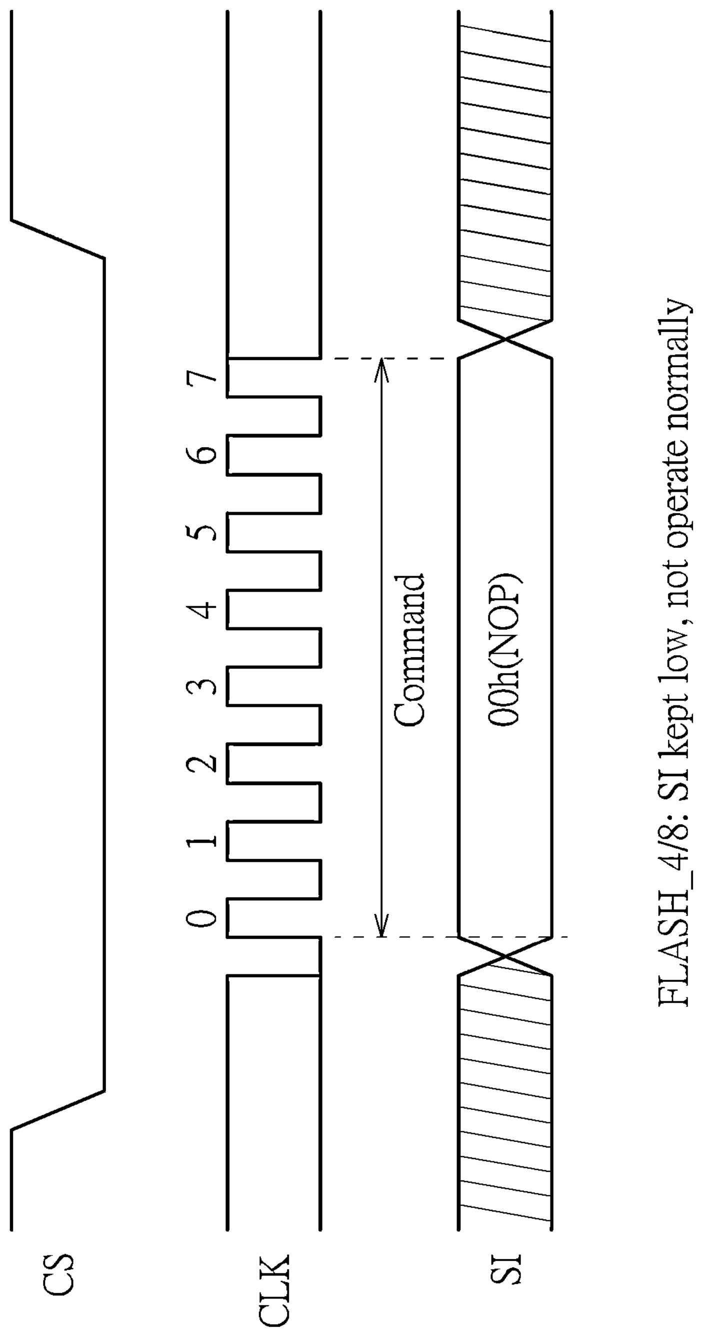
FIG. 10 is a waveform diagram of a non-selected SI pin.
Figure 11:
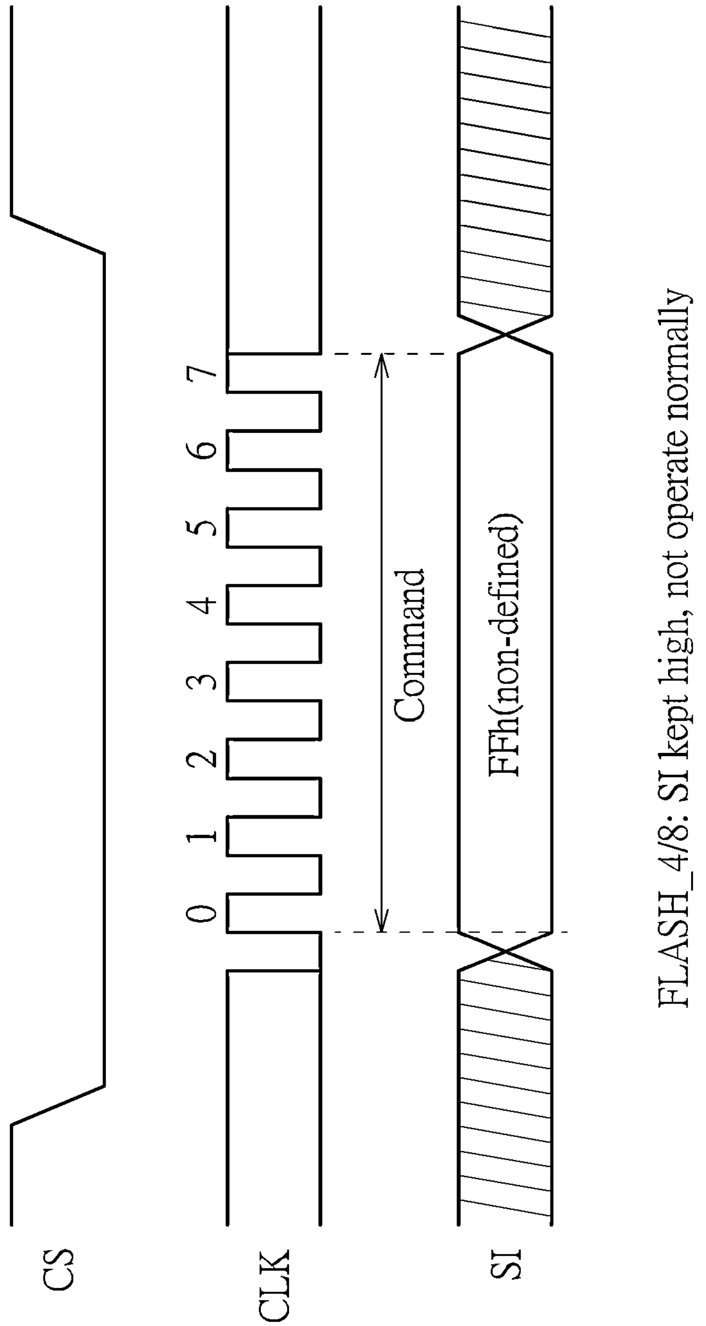
FIG. 11 is a waveform diagram of another non-selected SI pin.

As shown in FIG. 10, the non-selected SI pin is provided with a signal "00h", which means that the SI pin is kept low in the command byte. The signal "00h" is a no operation (NOP) command in the SPI specification. The flash memories receiving the NOP command may not perform any effective operation such as data readout or writing. In another embodiment, the non-selected SI pin may be provided with another signal "FFh" where the SI pin is kept high in the command byte. The signal "FFh" is also a NOP command (or called non-defined command, as shown in FIG. 11).

In a similar manner, if the LED controller 600 needs to perform a read/write operation on the flash memory FLASH_3, it may output correct control signals through the pins CS_B, CLK_B and SI_A, where the CS pin CS_B may be pulled low, the CLK pin CLK_B may toggle appropriately, and the SI pin SI_A may provide a valid read or write enable command. Other non-selected control pins may not output signals normally, so that other flash memories will not be enabled to perform normal operations. For example, the CS pin CS_A may be kept high, the CLK pin CLK_A may be kept high or low, and the SI pins SI_B and SI_C may provide a NOP command. In such a situation, among all the flash memories FLASH_0-FLASH_11, only the selected flash memory FLASH_3 can operate normally.

In a similar manner, if the LED controller 600 needs to perform a read/write operation on the flash memory FLASH_6, it may output correct control signals through the pins CS_A, CLK_B and SI_B, where the CS pin CS_A may be pulled low, the CLK pin CLK_B may toggle appropriately, and the SI pin SI_B may provide a valid read or write enable command. Other non-selected control pins may not output signals normally, so that other flash memories will not be enabled to perform normal operations. For example, the CS pin CS_B may be kept high, the CLK pin CLK_A may be kept high or low, and the SI pins SI_A and SI_C may provide a NOP command. In such a situation, among all the flash memories FLASH_0-FLASH_11, only the selected flash memory FLASH_6 can operate normally.

In a similar manner, if the LED controller 600 needs to perform a read/write operation on the flash memory FLASH_10, it may output correct control signals through the pins CS_A, CLK_B and SI_C, where the CS pin CS_A may be pulled low, the CLK pin CLK_B may toggle appropriately, and the SI pin SI_C may provide a valid read or write enable command. Other non-selected control pins may not output signals normally, so that other flash memories will not be enabled to perform normal operations. For example, the CS pin CS_B may be kept high, the CLK pin CLK_A may be kept high or low, and the SI pins SI_A and SI_B may provide a NOP command. In such a situation, among all the flash memories FLASH_0-FLASH_11, only the selected flash memory FLASH_10 can operate normally.

Please note that the present invention aims at providing a novel operational method for selecting and accessing multiple memories. Those skilled in the art may make modifications and alterations accordingly. For example, in the above embodiments, there are 12 flash memories controlled by the LED controller. In another embodiment, a master device such as the LED controller may be configured to control any number of slave devices such as the flash memories, where the number of control pins may be deployed accordingly. In addition, the operational method of the present invention is applied to an LED panel control system where an LED controller is configured to control multiple flash memories. In another embodiment, the master device may be any other controlling device such as a memory controller, touch controller, central processing unit (CPU), microprocessor or microcontroller unit (MCU), but not limited thereto. Alternatively or additionally, the slave device may be another type of memory, or may be any other controllable device such as a sensor or driver chip, but not limited thereto.

In the embodiments of the present invention, the target slave device (e.g., flash memory) is selected according to the outputs of CS pins, CLK pins and SI pins of the SPI. Since the slave devices are connected to the master device through different control pins, the combination of the select signal (through a CS pin), the clock signal (through a CLK pin), and the command (through an SI pin) may serve as a decoder. In other words, the decoding function is embedded in the combinations of the CS pins, CLK pins and SI pins, allowing the master device to select a target slave device by outputting appropriate signals through these control pins. These control pins may be allocated in any appropriate manner to realize the selection of slave devices, and the related implementations should not be limited to those described in the above paragraphs.

Figure 12:
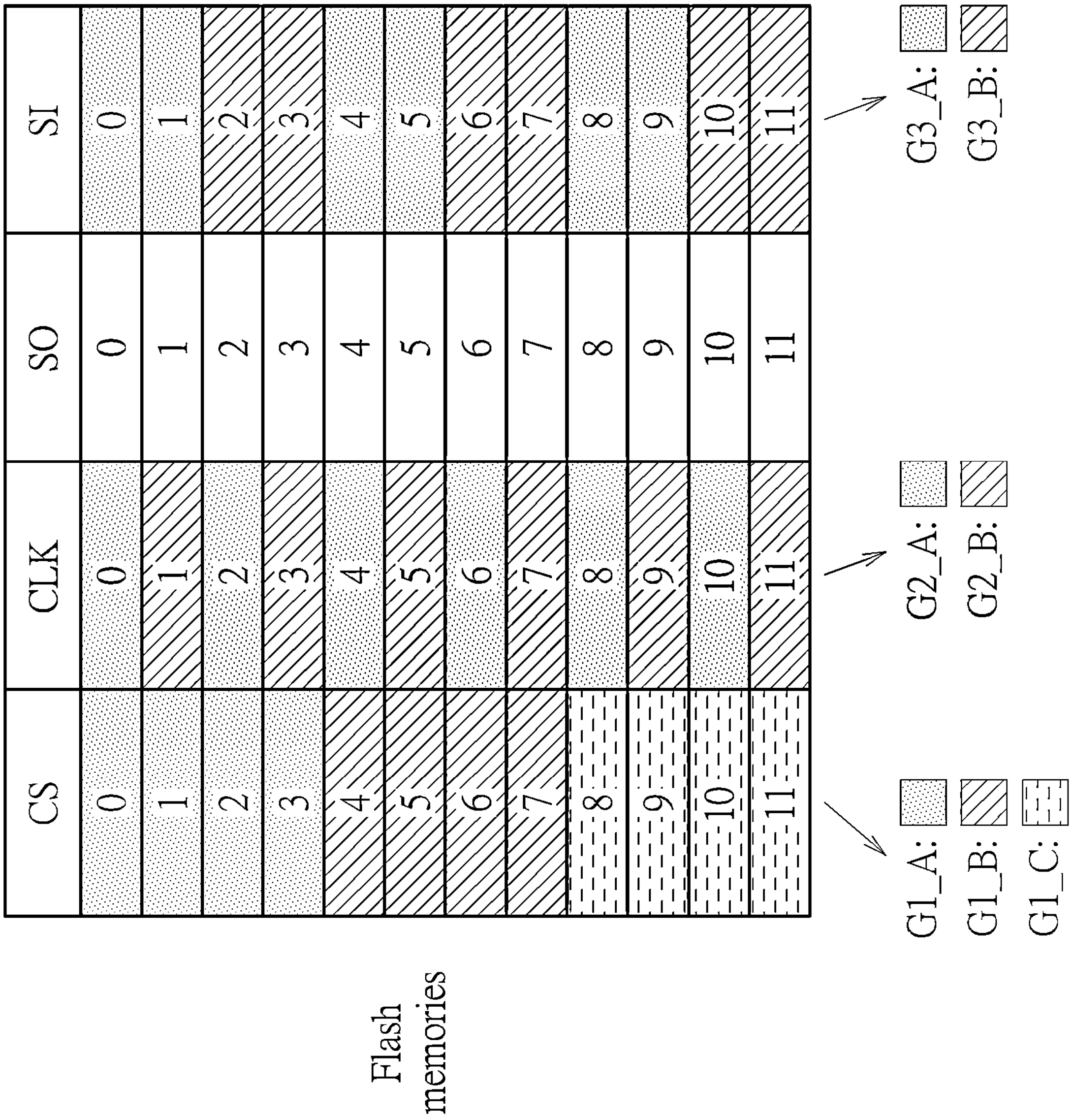
FIG. 12 illustrates an exemplary implementation of the group classifications of the flash memories.

For example, in another embodiment, through the SPI, an LED controller may be coupled to 12 flash memories FLASH_0-FLASH_11 through 3 CS pins CS_A, CS_B and CS_C, 2 CLK pins CLK_A and CLK_B, and 2 SI pins SI_A and SI_B. The flash memories FLASH_0-FLASH_11 may be classified into three groups G1_A, G1_B and G1_C that receive a select signal from the CS pins CS_A, CS_B and CS_C, respectively. The flash memories FLASH_0-FLASH_11 may also be classified into two groups G2_A and G2_B that receive a clock signal from the CLK pins CLK_A and CLK_B, respectively. The flash memories FLASH_0-FLASH_11 may further be classified into two groups G3_A and G3_B in a different manner, to receive a command from the SI pins SI_A and SI_B, respectively. An exemplary implementation of the group classifications of the flash memories FLASH 0-FLASH 11 is shown in FIG. 12.

In detail, the CS pin CS_A may be coupled to 4 flash memories FLASH_0/1/2/3 belonging to the group G1_A, the CS pin CS_B may be coupled to another 4 flash memories FLASH_4/5/6/7 belonging to the group G1_B, and the CS pin CS_C may be coupled to another 4 flash memories FLASH_8/9/10/11 belonging to the group G1_C. The CLK pin CLK_A may be coupled to 6 flash memories FLASH_0/2/4/6/8/10 belonging to the group G2_A, and the CLK pin CLK_B may be coupled to another 6 flash memories FLASH_1/3/5/7/9/11 belonging to the group G2_B. The SI pin SI_A may be coupled to 6 flash memories FLASH_0/1/4/5/8/9 belonging to the group G3_A, and the SI pin SI_B may be coupled to another 6 flash memories FLASH 2/3/6/7/10/11 belonging to the group G3_B. In order to select a target flash memory, the LED controller may pull low one of the CS pins (CS_A, CS_B or CS_C), output the correct clock signal through one of the CLK pins (CLK_A or CLK_B), and output a valid command through one of the SI pins (SI_A or SI_B).

Figure 13:
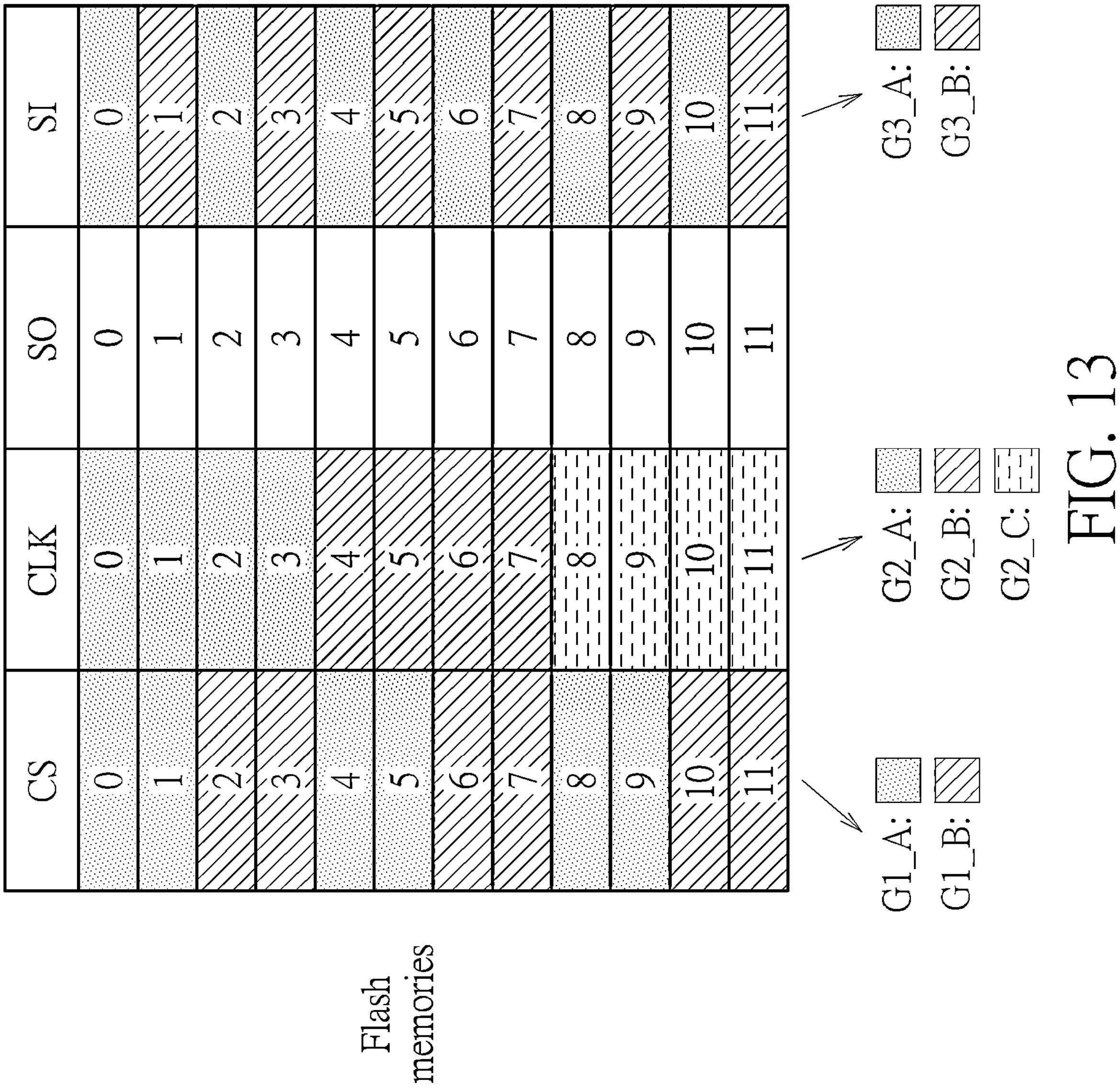
FIG. 13 illustrates another exemplary implementation of the group classifications of the flash memories.

In another embodiment, through the SPI, an LED controller may be coupled to 12 flash memories FLASH_0-FLASH_11 through 2 CS pins CS_A and CS_B, 3 CLK pins CLK_A, CLK_B and CLK_C, and 2 SI pins SI_A and SI_B. The flash memories FLASH_0-FLASH_11 may be classified into two groups G1_A and G1_B that receive a select signal from the CS pins CS_A and CS_B, respectively. The flash memories FLASH_0-FLASH_11 may also be classified into three groups G2_A, G2_B and G2_C that receive a clock signal from the CLK pins CLK_A, CLK_B and CLK_C, respectively. The flash memories FLASH_0-FLASH_11 may further be classified into two groups G3_A and G3_B in a different manner, to receive a command from the SI pins SI_A and SI_B, respectively. An exemplary implementation of the group classifications of the flash memories FLASH 0-FLASH 11 is shown in FIG. 13.

In detail, the CS pin CS_A may be coupled to 6 flash memories FLASH_0/1/4/5/8/9 belonging to the group G1_A, and the CS pin CS_B may be coupled to another 6 flash memories FLASH_2/3/6/7/10/11 belonging to the group G1_B. The CLK pin CLK_A may be coupled to 4 flash memories FLASH_0/1/2/3 belonging to the group G2_A, the CLK pin CLK_B may be coupled to another 4 flash memories FLASH_4/5/6/7 belonging to the group G2 B, and the CLK pin CLK_C may be coupled to another 4 flash memories FLASH_8/9/10/11 belonging to the group G2_C. The SI pin SI_A may be coupled to 6 flash memories FLASH_0/2/4/6/8/10 belonging to the group G3_A, and the SI pin SI_B may be coupled to 6 flash memories FLASH_1/3/5/7/9/11 belonging to the group G3_B. In order to select a target flash memory, the LED controller may pull low one of the CS pins (CS_A or CS_B), output the correct clock signal through one of the CLK pins (CLK_A, CLK_B or CLK_C), and output a valid command through one of the SI pins (SI_A or SI_B).

In the above embodiments, the SPI is taken as an example, where the CS pins, CLK pins and SI pins of the SPI are cooperatively applied to realize the selection of slave devices. Note that the application of the SPI is one of various implementations of the present invention. In another embodiment, another transmission interface having multiple select pins, multiple clock pins, and/or multiple signal pins may be applied, where each slave device may be coupled to one of the select pins, one of the clock pins, and one of the signal pins. A target slave device may be selected by applying a correct select signal through one of the select pins, outputting a correct clock through one of the clock pins, and outputting a valid data or command signal through one of the signal pins.

As a result, the operational method of the present invention is applicable to any control system having a master device for accessing multiple slave devices through any appropriate transmission interface, which are not limited to the LED controller, the flash memories, and/or the SPI described in this disclosure. The selection of slave devices may be realized by using a decoding function embedded in the combinations of different control pins, so as to reduce the number of pins in the transmission interface.

Figure 14:
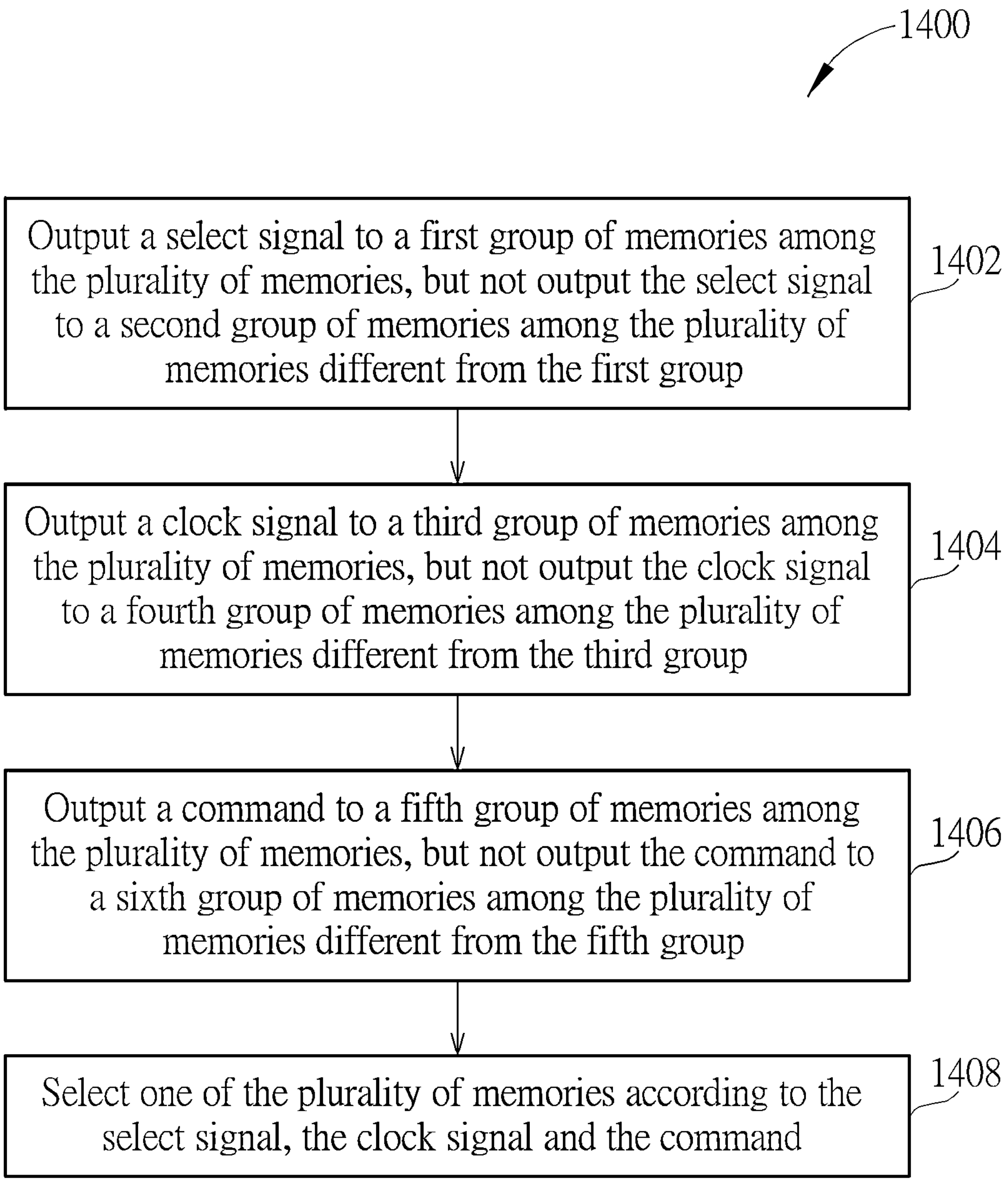
FIG. 14 is a flowchart of an operational process according to an embodiment of the present invention.

The abovementioned operations of accessing the slave devices by the master device may be summarized into an operational process 1400, as shown in FIG. 14. The operational process 1400 may be implemented in an LED controller as the master device (such as the LED controller 600 shown in FIG. 6A or FIG. 7), for controlling a plurality of memories as the slave devices (such as the flash memories FLASH_0-FLASH_11 shown in FIG. 6A or FIG. 7). As shown in FIG. 14, the operational process 1400 includes the following steps:

Step 1402: Output a select signal to a first group of memories among the plurality of memories, but not output the select signal to a second group of memories among the plurality of memories different from the first group.

Step 1404: Output a clock signal to a third group of memories among the plurality of memories, but not output the clock signal to a fourth group of memories among the plurality of memories different from the third group.

Step 1406: Output a command to a fifth group of memories among the plurality of memories, but not output the command to a sixth group of memories among the plurality of memories different from the fifth group.

Step 1408: Select one of the plurality of memories according to the select signal, the clock signal and the command.

In the operational process 1400, Steps 1402-1406 may be performed sequentially or simultaneously; that is, the select signal, the clock signal and the command may be output in a predetermined order or output at the same time. The related transmission sequence should not be a limitation of the present invention. Based on the group classifications and the outputs of these control signals, the target memory may be selected. The detailed implementations and operations of the operational process 1400 are illustrated in the above paragraphs, and will be omitted herein.

To sum up, the present invention provides a novel operational method for accessing a plurality of memories. The memories may be flash memories included in an LED display, where each flash memory may be deployed along with an LED light board, to record the compensation data for the corresponding light board. The LED display may further include an LED controller for selectively accessing the flash memories, to read out the compensation data stored in the flash memories or write the data into the flash memories. The LED controller may be coupled to the flash memories through multiple control pins, including CS pins, CLK pins and SI pins, which are configured to forward the select signal, clock signal and command, respectively. The flash memories are grouped in different manners, and thus each flash memory may be coupled to the LED controller through one of the CS pins, one of the CLK pins, and one of the SI pins. In order to select a target flash memory, the LED controller may output the select signal through one of the CS pins, output the clock signal through one of the CLK pins, and output the command through one of the SI pins. The combination of the select signal, clock signal and the command may serve as a decoder, so that the LED controller may access the selected flash memory according to these control signals.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An operational method for a plurality of memories, comprising:

outputting a select signal to a first group of memories among the plurality of memories, but not outputting the select signal to a second group of memories among the plurality of memories different from the first group;

outputting a clock signal to a third group of memories among the plurality of memories, but not outputting the clock signal to a fourth group of memories among the plurality of memories different from the third group;

outputting a command to a fifth group of memories among the plurality of memories, but not outputting the command to a sixth group of memories among the plurality of memories different from the fifth group; and selecting one of the plurality of memories according to the select signal, the clock signal and the command;

wherein the plurality of memories are classified into a first plurality of groups having the first group and the second group in a first manner, classified into a second plurality of groups having the third group and the fourth group in a second manner different from the first manner, and classified into a third plurality of groups having the fifth group and the sixth group in a third manner different from the first manner and the second manner; and wherein any one of the first plurality of groups, any one of the second plurality of groups, and any one of the third plurality of groups have a common memory among the plurality of memories.

2. The operational method of claim 1, wherein the step of selecting the one of the plurality of memories according to the select signal, the clock signal and the command comprises:

selectively accessing the one of the plurality of memories according to a combination of the select signal, the clock signal and the command.

3. The operational method of claim 1, wherein the step of selecting the one of the plurality of memories according to the select signal, the clock signal and the command comprises:

selecting a first memory among the plurality of memories when the first memory belongs to the first group, the third group and the fifth group.

4. The operational method of claim 1, wherein the select signal is output to the first group of memories through a first buffer, the clock signal is output to the third group of memories through a second buffer, and the command is output to the fifth group of memories through a third buffer.

5. The operational method of claim 1, wherein each of the plurality of memories belongs to at least one different group from another memory among the plurality of memories.

6. The operational method of claim 1, wherein the plurality of memories are controlled by using a serial peripheral interface (SPI), and the select signal, the clock signal and the command are transmitted through the SPI.

7. The operational method of claim 1, wherein the plurality of memories are flash memories respectively deployed on a plurality of light boards of a light-emitting diode (LED) display.

8. A controller to control a plurality of memories, comprising:

a plurality of select pins, respectively coupled to a first plurality of groups of memories among the plurality of memories;

a plurality of clock pins, respectively coupled to a second plurality of groups of memories among the plurality of memories; and a plurality of signal pins, respectively coupled to a third plurality of groups of memories among the plurality of memories;

wherein any one of the first plurality of groups, any one of the second plurality of groups, and any one of the third plurality of groups have a common memory among the plurality of memories;

wherein the controller outputs a select signal through one of the plurality of select pins, outputs a clock signal through one of the plurality of clock pins, and outputs a command through one of the plurality of signal pins;

wherein the controller selects one of the plurality of memories according to the select signal, the clock signal and the command.

9. The controller of claim 8, wherein the controller is deployed on a control board of a light-emitting diode (LED) display, and the plurality of memories are flash memories respectively deployed on a plurality of light boards of the LED display.

* * * * *